United States Patent [19]

Kirkman et al.

[11] Patent Number: 4,545,650
[45] Date of Patent: Oct. 8, 1985

[54] LIQUID FILLED ELECTRO-OPTIC DISPLAY CELL WITH DIAPHRAGM SEAL

[75] Inventors: David H. Kirkman, Winchester; Anthony C. Lowe, North Baddesley; John C. Wood, Eastleigh; Ian Golledge, Romsey, all of England

[73] Assignee: International Business Machines Corporation, Armonk, N.Y.

[21] Appl. No.: 560,049

[22] Filed: Dec. 9, 1983

[30] Foreign Application Priority Data

Dec. 30, 1982 [EP] European Pat. Off. ......... 82306990.1

[51] Int. Cl.⁴ .............................................. G02F 1/01
[52] U.S. Cl. .................................... 350/357; 350/391
[58] Field of Search ....................... 350/343, 357, 391

[56] References Cited

U.S. PATENT DOCUMENTS

| | | | |
|---|---|---|---|
| 3,866,313 | 2/1975 | Yih | 350/343 X |
| 4,106,860 | 8/1978 | Kaufmann | 350/343 |
| 4,135,789 | 1/1979 | Hall | 350/343 |
| 4,147,416 | 4/1979 | Shimizu | 350/357 |

FOREIGN PATENT DOCUMENTS

| | | | |
|---|---|---|---|
| 0145159 | 11/1979 | Japan | 350/343 |
| 0135918 | 8/1982 | Japan | 350/343 |
| 0210324 | 12/1982 | Japan | 350/343 |

Primary Examiner—John K. Corbin
Assistant Examiner—David Lewis
Attorney, Agent, or Firm—Yen S. Yee; Alexander Tognino

[57] ABSTRACT

A liquid-filled electro-optic display cell employs an elastomeric diaphragm to seal a filling orifice in the cell side wall. The orifice is surrounded by a rim and the diaphragm is retained over the rim in such a way as to seal the orifice while remaining free to flex over central portions of the orifice. This retention may be effected by means of an annular washer and clamping pin. In this way, sealing is effected and thermal expansion accommodated. The cell is filled by turning it until the orifice is uppermost and filling it until a convex meniscus is formed above the rim to ensure that the diaphragm seals the orifice without introduction of bubbles.

8 Claims, 8 Drawing Figures

LIQUID FILLED ELECTRO-OPTIC DISPLAY CELL WITH DIAPHRAGM SEAL

TECHNICAL FIELD OF THE INVENTION

The invention relates to liquid filled electro-optic display cells and to methods of filling and sealing such cells.

BACKGROUND ART

Electro-optic display cells, such as electrochromic, electrophoretic or liquid crystal displays, employ a liquid electrolyte in a hermetically sealed enclosure. During construction, the liquid is introduced through one or more filling holes which must subsequently be hermetically sealed with, typically, a glass, resin, or solder plug. Although generally located in a faceplate of cells of sandwich type construction, filling holes are also known in the spacer, or side wall, separating two such plates. Typical of this prior art are U.S. Pat. Nos. 4,188,095, 4,199,228 and 4,239,350.

The use of elastomers in sealing arrangements for such cells is also known. Published European patent application EU 3145-A1 shows a liquid containing display of sandwich construction in which two filling holes are provided, one in each faceplate. A common elastomeric plug is drawn through both these holes to seal them. The plug has broad ends to prevent it working loose. An alternative arrangement with a single filling hole is also described in which a sealing plug is drawn through a channel shaped "brace" on the exterior of the faceplate so as to cover the filling hole.

U.S. Pat. No. 4,135,789 essentially describes the sealing of a filling hole with a glass plug which is fused into the hole by heating through a metal cap. Also provided below the glass plug is a polytetrafluoroethylene "separator" pad which is elastomeric and resiliently engages the side walls of the filling hole. The basic purpose of the pad is to isolate the underlying liquid crystal thermally during the fusing of the glass plug.

One problem encountered with such hermetically sealed liquid filled displays is that of differential thermal expansion between the liquid and its enclosure. Published British patent application No. 2,046,935A shows a sandwich cell construction in which a pair of glass plates are sealed around their edges by a double epoxy resin spacer and sealant, the inner portion of which is cured by reaction with the electrolyte. The same resin sealant is used to seal a filling hole. Such adhesive sealing techniques have the disadvantage that the electrolyte may become contaminated by the adhesive or a curing agent. This publication mentions that the peripheral sealant must have sufficient flexibility to withstand thermal expansion of the substrates and electrolyte. However, if the volume of liquid is at all large, such an expansion mechanism may be inadequate and a risk of rupturing the seal may exist.

An alternative approach to the expansion problem is shown in published European patent application EU 30493A involving the deliberate introduction of a gas bubble in an expansion chamber segregated from the main display chamber. A similar approach is shown in U.S. Pat. No. 4,310,220. It has been found that although the gas bubble cannot pass directly from the expansion to the display chamber, thermal cycling of the display can result in some gas dissolving and later reforming as bubbles in the display chamber.

DISCLOSURE OF THE INVENTION

The prior art has recognised the problems of filling and sealing liquid electrolyte display cells and of accommodating thermal expansion. However, filling and sealing without thermal or chemical side effects by a technique which also allows for expansion has not been achieved.

Accordingly, the present invention provides a liquid filled electro-optic display cell having an enclosure for the liquid; a filling orifice in one of the enclosure walls, the orifice being surrounded by a rim; an impervious elastomeric diaphragm in contact with the rim so as to seal the orifice; and a retaining means for retaining the diaphragm in contact with the rim while allowing it freedom to flex over a central portion of the orifice thereby to accommodate differential thermal expansion of the liquid and enclosure.

The elastomeric diaphragm of such a display cell meets both the sealing and thermal expansion requirements of the cell. The diaphragm material may be pre-cured and is therefore unlikely to contaminate the liquid. No heat is needed. The structure is also easy to assemble and disassemble.

Preferably, the enclosure comprises a base, a transparent cover and side walls, the filling orifice being located in one of the side walls. Such a filling and sealing arrangement is particularly easy to implement in an electrochromic cell where the depth of liquid is not severely restricted so that the cell side wall structure can include relatively complex features.

The invention also provides a method of filling with liquid and sealing such a display cell comprising the steps of: positioning the cell with its filling orifice uppermost; introducing liquid into the cell through the orifice until a convex meniscus is formed above the rim; placing the elastomeric diaphragm onto the rim over the meniscus to expel the excess liquid from above the rim; and retaining the diaphragm in contact with the rim to form a liquid-tight seal.

This method avoids the introduction of bubbles during sealing. Preferably, of course, the diaphragm is not merely retained but is compressed onto the rim.

When the filling orifice is in a side wall of the enclosure, the method is particularly effective in assisting the escape of any bubbles from the cell prior to sealing. Another preferred structural feature which assists the removal of bubbles during filling is that at least some of the inner faces of the enclosure taper towards the filling orifice, giving a bottle neck effect.

For the most effective seal, it is preferred that the rim around the orifice should be raised and, ideally, should be a knife edge.

In order to compress the diaphragm, which is preferably discoidal, onto the rim, it is preferred that the cell include a housing for the diaphragm which includes a well coextensive with the periphery of the diaphragm. The preferred retaining means includes an annular washer located on the opposite side of the diaphragm to the rim, and a pin passing through a cross bore intersecting the well of the housing. The pin, which is preferably eccentric in cross section, compresses the diaphragm at its edges between the washer and the rim.

The invention will now be described, by way of example, with reference to a preferred embodiment thereof, as illustrated in the following drawings.

DETAILED DESCRIPTION

Figure 1:
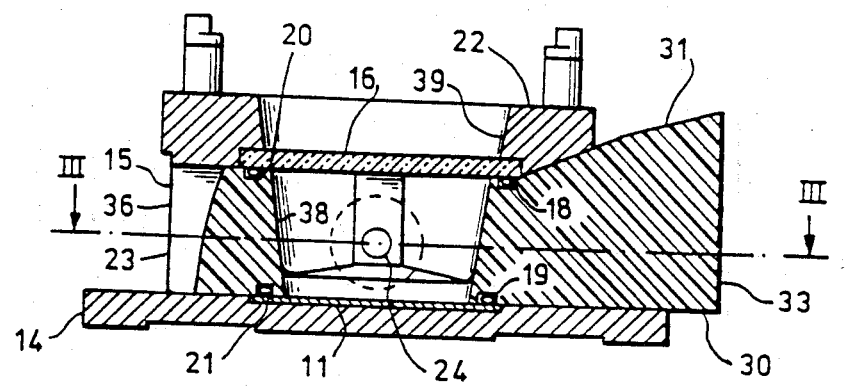
FIG. 1 is a side sectional view on the line I—I of FIG. 2 through a hermetic electro-optic display cell according to the present invention.
Figure 2:
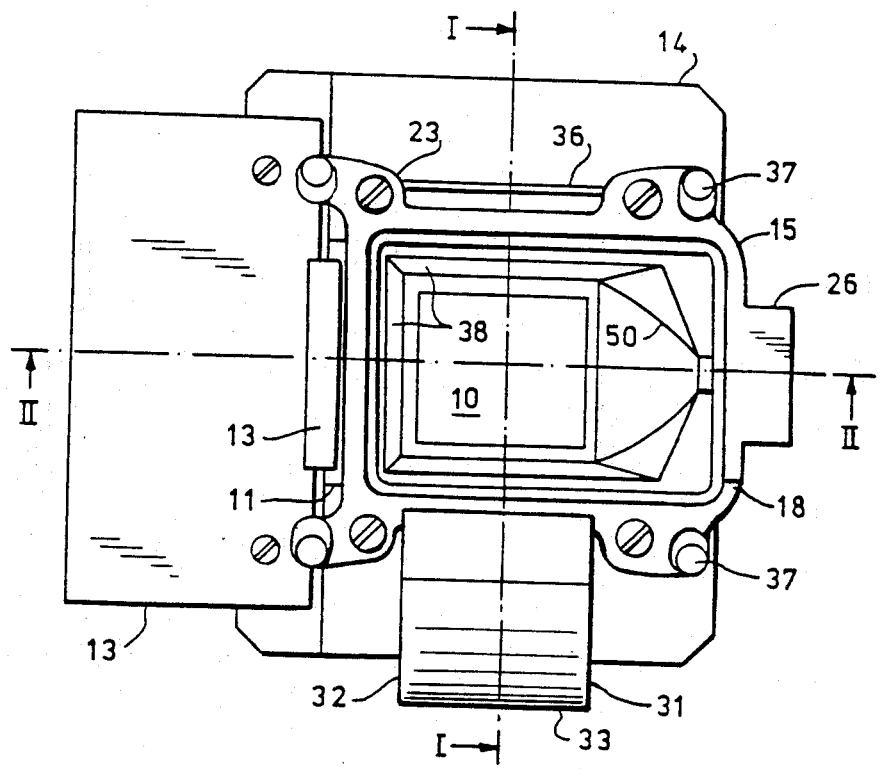
FIG. 2 is a plan view of the display cell of FIG. 1 with clamp plate and coverglass removed.

With reference to FIGS. 1 and 2, the hermetic display cell shown is an electrochromic display, employing viologen in aqueous solution as the electrochromic material. The viologen is a mixture of 1,1' di-heptyl 4,4' bipyridinium phosphate and hypophosphite as described in our U.S. Pat. No. 4,187,003. The display is a matrix-addressable display in which a rectangular array 10 of silver display electrodes are formed on the upper surface of a silicon chip 11 which forms the base of the cell enclosure.

Each of the array of electrodes is connected to one of an underlying matrix of field-effect transistors formed in the chip 11 by integrated circuit techniques. The electrode/transistor matrix is made as described in commonly assigned copending U.S. patent application Ser. No. 560,051 filed Dec. 9, 1983 for a "Semiconductor Integrated Display and Method of Making Same" (Docket no. UK9-82-018). External electrical connection of the chip 11 is by means of a multiwire cable 12. This connects pads, not shown, at one end of chip 11 which protrudes beyond the enclosure, to a printed circuit board 13. Details of the electrical operation of the matrix display are given in allowed U.S. patent application Ser. No. 259,268, now U.S. Pat. No. 4,426,643 (also published as European patent application No. 42893-A1).

Since the chip 11 is fragile, it is supported by a heavy aluminium base 14 to which the printed circuit board 13 is also bolted. The side wall of the enclosure is formed by a frame 15 moulded from an acrylic plastics material, polymethyl methacrylate. The frame is a relatively complex shape as it includes many features connected with the filling and sealing of the cell and also with the optical aspects of the display, as will be described.

Figure 3:
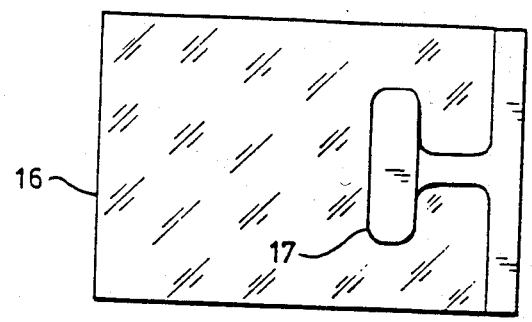
FIG. 3 is plan view of the cover glass of the display cell of FIG. 1.

The top cover of the liquid enclosure of the cell is a glass plate 16, shown in FIG. 3, which rests on top of the frame 15. The glass cover 16 has deposited thereon, a counter electrode 17 of platinum black electrodeposited on a conductor pattern comprising gold over a titanium adhesion layer.

Figure 4:
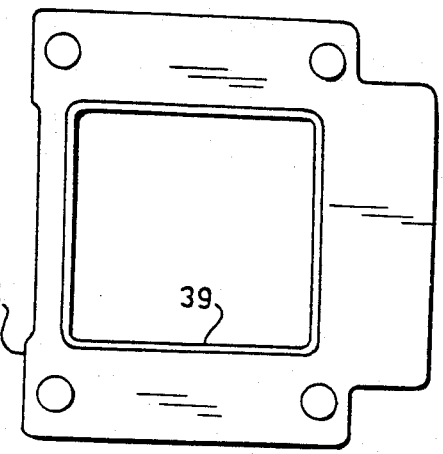
FIG. 4 is a plan view of the clamp plate of the display cell of FIG. 1.

To seal the glass cover 16 to the frame 15, and the frame to the chip 11, the frame is provided with two grooves 18 and 19 around the upper and lower edges of its walls. In each of these grooves are O-ring gaskets 20 and 21 made of an inert, impervious fluorocarbon polymer. The gaskets are compressed by means of a clamp plate 22, shown in FIG. 4 which is bolted down onto the glass plate 16 by four nuts 23 which engage threaded pins set into the base.

The above described components constitute a complete liquid enclosure for the display cell except for a filling orifice 24 in one wall of the frame 15. This orifice is sealed, as will be described in connection with FIGS. 6-8, by a flexible diaphragm 25, also made of an inert fluorocarbon polymer, which is seated in a housing 26.

Figure 5:
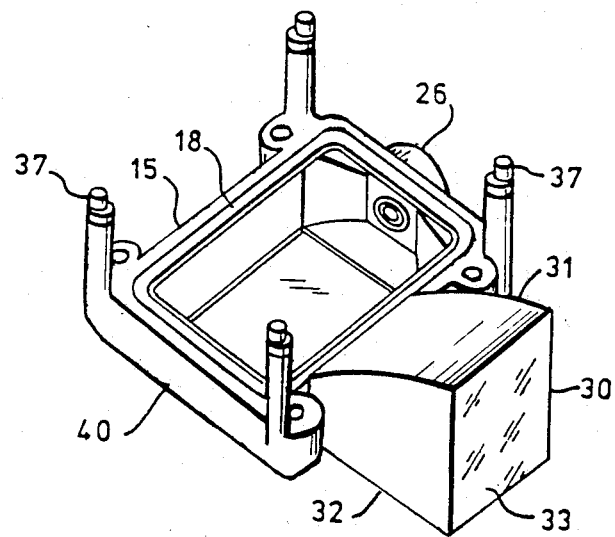
FIG. 5 is a perspective view of a moulded frame forming the side wall structure of the cell of FIG. 1.

The remaining features of the frame 15 relate predominantly to the optical arrangements for projecting the displayed image onto a screen. A prominent feature (ref. FIGS. 1 and 5) is a side light guide 30 in the form of a multi-facetted truncated wedge. The guide 30 is integral with the frame 15 and forms one wall thereof. Its upper facets 31 and also its side faces 32 must be silvered for optical reasons to direct light into the cell but, of course, its input face 33 must be transparent.

The outer face of the opposite wall 36 of the frame is also facetted and silvered to reflect escaping projection light back into the cell to increase illumination of display area 10. Because the silver electrodes constituting area 10 have matt surfaces, light from them is scattered randomly and a proportion emerges from the top of the cell through the window 16. This light reaches a projection lens (not shown) whose mounting ring is registered on shoulders of four pillars 37 and is projected onto a screen (not shown). To reduce vignetting, the inner walls 38 of frame 15 slope outwardly from the display area, as do edges 39 of clamp plate 22. The optical arrangement of the display cell, lamp and projection lens is substantially the same as that described in allowed U.S. patent application Ser. No. 307,914, now U.S. Pat. No. 4,436,378 (also published as European patent application No. 55317-A1).

The acrylic material of which the frame 15 is formed is permeable to a limited extent to both cell liquid and to the atmosphere. Over a period of a few months, loss of cell liquid and formation of gas bubbles could severely impair the display function. For this reason, much of the external surface of the frame 15 is metallised to a sufficient thickness to render the package hermetic. The metallisation consists of 2000 Å of evaporated silver followed by 25 microns of electroplated copper, which has been found to be sufficient to close off the largest pinholes in the evaporated silver layer. An electroless top layer of 1500 Å of tin protects the copper from corrosion.

Figure 6:
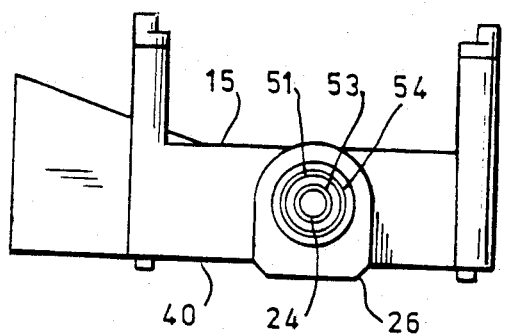
FIG. 6 is a rear elevation of the frame of FIG. 5 in which a filling orifice is visible.

The metallic sealing layer 40 is indicated by cross hatching in FIGS. 2, 5 and 6. Essentially, all exterior wall surfaces of the frame, except for the tops of pillars 37, are coated up to the O-ring grooves 18 and 19. Coating inwardly beyond the grooves is not necessary because of the seal afforded by the O-ring gaskets 20 and 21 and the impervious nature of glass cover plate 16 and silicon chip 11. It is also undesirable because of possible contamination of the viologen solution. The interior of diaphragm housing 26 is not coated as this will be sealed by diaphragm 25.

The input face 33 of light guide 30 is not coated, since transparency is essential, although all the other faces 31, 32, etc of the guide are coated. In the case of this particular design, the sheer bulk of the guide compared to the general wall thickness suffices to reduce permeation to acceptable levels. If this were not the case, a transparent coating of silica could be employed or a glass cover plate adhesively bonded to the face.

The process by which the frame 15 is coated will now be described. In order to obtain adhesion of the evaporated silver to the acrylic, an extensive cleaning cycle must be carried out. In particular all traces of mould release agent and pre-acrylic monomer must be removed.

This is achieved by, firstly, washing and scrubbing the moulded frame in 1% solution of a commercially available surfactant (DECON) 90 which is a complex emulsion of highest quality anionic and nonionic surface active agents, stabilizing agents, alkalis and non-phosphate detergent builders in an aqueous base available from DECON Laboratories Ltd., of Hove, England and then rinsing in de-ionised water. The frame is next rinsed in analar propan-2-ol and dried in pure nitrogen after which it is placed in a vacuum chamber for 12–24 hours. This rinse, drying and evacuation cycle is repeated up to three times. Immersion time in propan-2-ol must be minimised particularly for moulded acrylic to avoid softening. If this is a problem, washing in a fluorocarbon solvent is an alternative. After pre-cleaning is complete, the frame is sufficiently clean to be transferred to an evaporator.

The frame is clamped in a jig which sits in the O-ring grooves 18 and 19 and which shields the interior of the frame from the evaporation. The base of the orifice in diaphragm housing 26 is temporarily plugged. After subjecting the frame to a glow discharge in a nitrogen atmosphere for final cleaning and adhesion promotion, the chamber is evacuated. A 2000 Å layer of silver is then evaporated from a resistance source onto the cold frame. The frame is then turned to different orientations and the evaporation sequence, omitting the glow discharge, is repeated until all surfaces have been coated. The distance from source to substrate is from 300–400 mm. Continuous evaporation is not permitted for more than 30 seconds at a time to avoid undue heating of the plastics frame.

The silvered frame is now transferred to a copper electroplating bath containing 50 gm/l copper sulphate, 60 gm/l sodium potassium tartrate and ammonium hydroxide to raise the pH to 7.5. Electrical connection is made to the silver coating by means of a tapered plug which fits into a bore in housing 26. 25 microns of copper are plated at a current density of 1.08 Adm$^{-2}$ at room temperature under moderate air agitation. The copper deposit is uniform, pore-free and ductile.

Finally the frame is coated with 1500 Å of tin in an electroless bath to protect the copper from corrosion. Before use, the frame is immersed in circulating de-ionised water for at least 12 hours to leach out any ions which may have penetrated the plastic during the plating processes.

The display cell is assembled as indicated in the above description by placing gaskets 20 and 21 in their respective grooves and clamping the chip 11, frame 15 and glass cover plate 16 together between clamp plate 22 and base 14 to form the cell enclosure.

The cell is then filled with the viologen electrolyte and sealed as will now be described with reference to FIGS. 6–8. Before it is filled the cell is purged with Argon.

Figure 7:
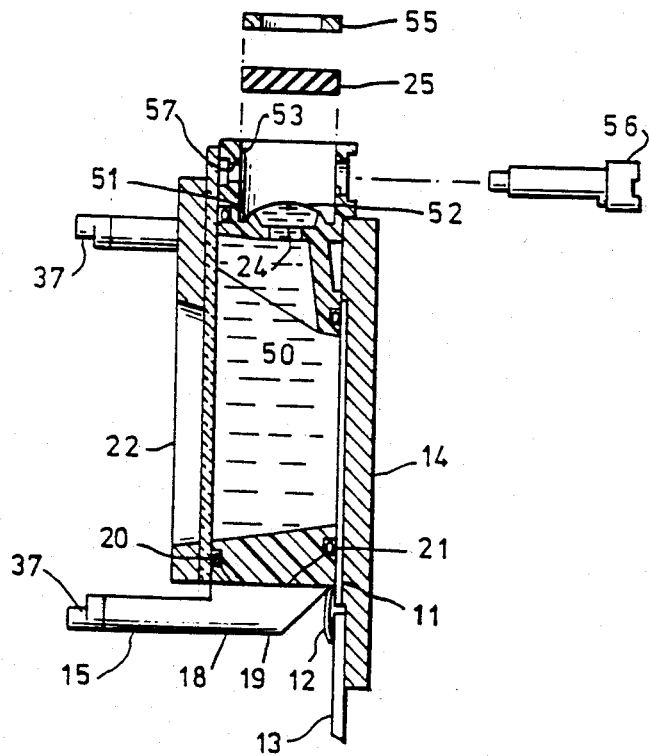
FIG. 7 is a side section through the cell of FIG. 1, taken on the line II—II of FIG. 2, showing the cell in partly disassembled state to illustrate the filling arrangement.
Figure 8:
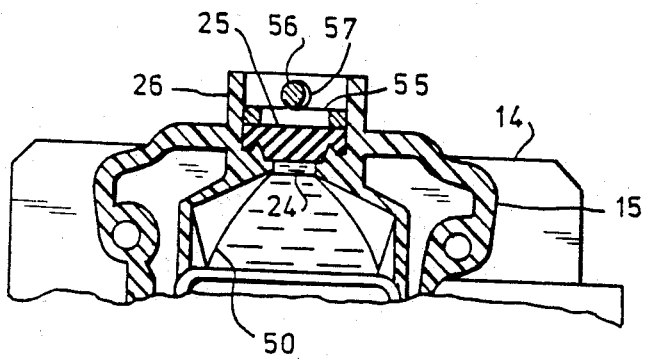
FIG. 8 is a section through a portion of the assembled cell, including the filling orifice, taken on the line III—III of FIG. 1.

In order to fill the cell, it is oriented approximately vertically as shown in FIG. 7, and filled slowly through a tube inserted through filling orifice 24 which is now located at the uppermost point of the enclosure. The interior walls of the enclosure form a tapering neck 50 to assist the escape of any bubbles. As shown in FIG. 7, on the outside of orifice 24 is a knife-edge annular rim 51 above which a convex meniscus 52 is formed. Care must be taken that excess electrolyte does not spill onto the exterior of the enclosure.

The sealing diaphragm 25 is lowered down a bore 53 in housing 26 until it rests on the knife edge 51. Any small excess of liquid is displaced into the surrounding gutter by the diaphragm without introduction of bubbles into the cell. An annular washer 55 is then placed over the diaphragm.

An eccentric pin 56 is then passed through a cross bore 57 in the housing 26. With its flattened side lowermost, the pin just clears the washer 55. The pin is then rotated to the position shown in FIG. 8. This rotation depresses the washer and compresses the diaphragm 25 onto the knife edge 51. The cell is now perfectly sealed. Additionally, because the diaphragm 25 is elastomeric and is not restrained in the centre, it can flex to accommodate differential thermal expansion of the liquid and enclosure.

We claim:

1. A liquid filled electro-optic display cell having: an enclosure for the liquid; a filling orifice in one of the walls of the enclosure, said orifice being surrounded by a rim which is raised; an impervious elastomer diaphragm in contact with said rim so as to seal the orifice; and a retaining means for retaining said diaphragm in contact with said rim while allowing it freedom to flex over a central portion of said orifice thereby to accommodate differential thermal expansion of the liquid and enclosure.

2. A display cell as claimed in claim 1 in which the enclosure comprises a base, a transparent cover and side walls, the filling orifice being located in one of the side walls.

3. A display cell as claimed in claim 2 in which at least some of the inner faces of the enclosure taper towards the filling orifice.

4. A display cell as claimed in claim 1 in which the raised rim is in the form of a knife edge.

5. A display cell as claimed in claim 1 including a housing for the diaphragm, said housing have an axial bore above the filling orifice, said bore being coextensive with said periphery of the diaphragm.

6. A display cell as claimed in claim 5 in which the diaphragm is discoidal and in which the retaining means includes an annular washer located on the opposite side of the diaphragm to the rim.

7. A display cell as claimed in claim 6 in which the housing includes a transverse bore intersecting the axial bore and a retaining means which includes a pin located in the transverse bore for compressing the diaphragm at its edges between the washer and the rim.

8. A display cell as claimed in claim 1 in which the elastomer diaphragm is an inert fluorocarbon polymer.

* * * * *